March 26, 1968 M. TURKAT 3,375,308
METHOD OF MAKING HIGH PURITY AND NON-MELTING FILAMENTS
Filed April 21, 1964 2 Sheets-Sheet 1

INVENTOR
MICHAEL TURKAT
BY
ATTORNEY.

March 26, 1968 M. TURKAT 3,375,308
METHOD OF MAKING HIGH PURITY AND NON-MELTING FILAMENTS
Filed April 21, 1964 2 Sheets-Sheet 2

INVENTOR
MICHAEL TURKAT
BY
ATTORNEY.

United States Patent Office 3,375,308
Patented Mar. 26, 1968

3,375,308
METHOD OF MAKING HIGH PURITY AND NON-MELTING FILAMENTS
Michael Turkat, Bayside, N.Y., assignor, by mesne assignments, to Space Age Materials Corporation, Woodside, N.Y., a corporation of Delaware
Continuation-in-part of application Ser. No. 130,153, Aug. 8, 1961. This application Apr. 21, 1964, Ser. No. 361,492
3 Claims. (Cl. 264—29)

This invention relates to filaments and more particularly to an apparatus and method of manufacturing refractory filaments.

The present invention is a continuation-in-part of applicant's copending application, Ser. No. 130,153, filed Aug. 8, 1961 and entitled High Purity and Non-Melting Ablative Filaments.

Filaments for various applications, such as lamps, vacuum tubes and the like, have heretofore been made of materials that melt or can be easily extruded or drawn in a softened state or cold stretched, as in the case of wire filaments.

An object of this invention is to make high temperature resistant, high strength filaments in continuous lengths of 1–1,000 feet or more from refractory metal or ablative materials, such as pyrolytic graphite.

Another object of the invention is to manufacture filaments of refractory materials, some of which are ablative and which are characterized by the properties that they do not melt under intense heat or that their melting point is so high that prior methods of wire production are not applicable.

A feature of the invention is a filament formed of the class of ablative materials including pyrolytic graphite, carbides and combinations of these with refractory metals and alloys thereof.

Another feature of the invention is the fabrication of high purity, non-melting crystalline filaments of ablative materials by the process of cracking or decomposing suitable corresponding gases or mixtures of gases under extremely high temperatures.

Another feature of the invention is the provision of pyrolytic graphite or carbides to protect refractory metals, such as tungsten, molybdenum or non-metals.

Another feature of the invention is the fabrication of high-purity, non-melting, non-porous filaments of appreciable length, by the process of cracking or decomposing suitable gases or mixtures of gases under extremely high temperatures and thereby causing the deposition of carbon and carbides on suitable mandrels.

In accordance with the invention, high temperature, high strength ablative refractory materials, such as pyrolytic graphite, for example, are produced by vapor decomposition and hydrocarbon gas cracking techniques to provide pure crystalline refractory metals, carbides, silicides and borides in free standing shapes, coatings and in compositions to form shapes and structures for space age applications.

The vapor decomposition technique permits fabrication of shapes from ablative refractory materials deposited on spiral or straight mandrels which are difficult to work with by other methods. The resulting products are characterized by high purity, non-porosity, crystallinity and operability at superhigh temperatures in the range from 5000°–10,000° F.

For example, starting with a hydrocarbon gas, metered amounts of refractory metal halide vapors can be mixed along with hydrogen carrier gas to produce a composite material of pyrolytic graphite with refractory metal carbide.

An alternate procedure would end with a mixture of refractory metal halide and hydrogen, yielding a coating of pure metal. Further heat treatment would yield an adherent coating by diffusion bonding to the graphite composite substrate through the formation of an intermediate carbide layer.

The materials provided in accordance with the invention have properties and characteristics suitable for application to missile cones, rocket nozzles, missile body sections, extremely high temperature furnace linings and for high temperature piping, filament wound containers for solid fuel in missiles and the like.

Other objects and features will become apparent to those skilled in the art when the following disclosure is read in connection with the accompanying drawings.

Figures 1, 2, 3A, 3B, 3C, 3D:
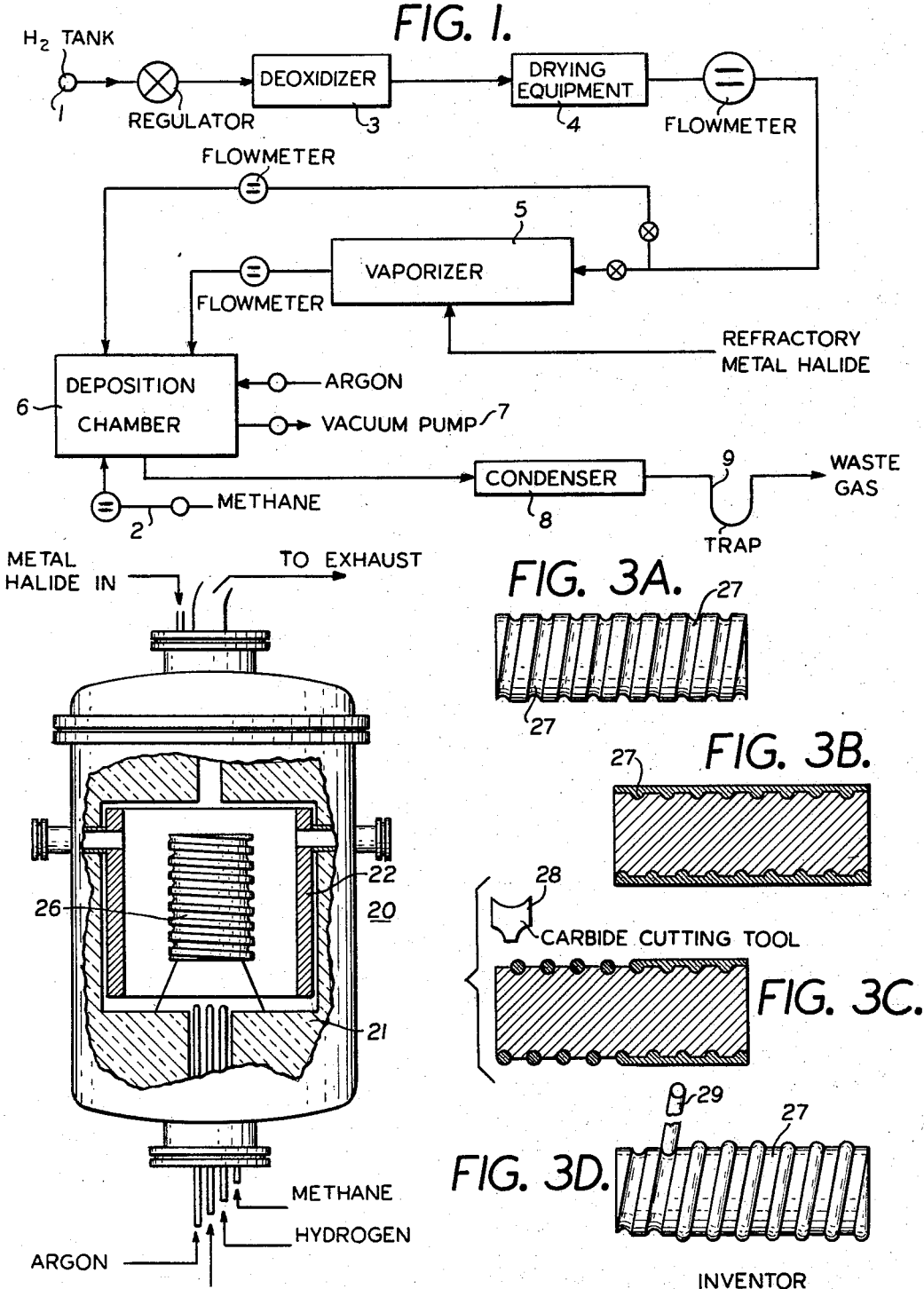
FIGURE 1 is a schematic diagram of a process for forming refractory and ablative filaments in accordance with the invention.
FIGURE 2 is an elevational view partially broken away of the high temperature furnace for producing filaments in accordance with FIGURE 1.
FIGURES 3A to 3E are various perspective and sectional views of threaded mandrels involved in the process of coating and fabricating the filaments illustrated in FIGURES 1 and 2.

Some typical ablative materials utilized in filament formation in accordance with the invention, are those found in the carbon family. It is well-known that carbon is one of the few elements that does not melt under extremes of temperature. Carbon usually recrystallizes and orients under high temperature to form graphite and it sublimates at still higher temperatures. It is not ductile at ordinary temperatures, which makes it a very difficult material to work. However, by means of the vaporization and cracking processes described in accordance with the invention, carbon and carbon base materials, pyrolytic graphite, carbides, refractory metal alloys or combinations of these with ablative materials are now provided and become essential to the fabrication of special filaments and of shapes difficult to make by conventional materials and methods.

The various materials provided in accordance with the invention have special properties, among which are that they will not melt at superhigh temperatures, that heat is dissipated primarily by radiation and by evaporation of material through sublimation.

Since the temperature limit for elemental solids and compounds is in the neighborhood of 7,000–8,000° F., surface temperatures in excess of this will result in melting, evaporation or sublimation of the material exposed to such high temperature environments. Thus, the conditions under which any material will withstand these extreme temperatures, is a function of time and energy input required to raise the surface temperature of the material to that point.

The term "pyrolytic graphite" as used herein represents a pure polycrystalline graphite deposited from a carbon bearing vapor at temperatures around 3450°–5000° F. or higher. It is a metallic appearing material that is impervious to gases; is stronger than commercial graphite and exhibits a greater degree of anisotropy in a number of physical and chemical properties, for example, thermal and electrical, than single natural graphite. At room temperatures, its thermal conductivity along the basal planes, parallel to the deposition surface, is higher than that of any other known material. The thermal conductivity perpendicular to the layer planes or deposition surface is lower by several orders of magnitude. The pyrolytic carbon crystallites tend to have their basal planes aligned parallel to the surface of deposition, and this orientation is a function of deposition temperature and density.

With respect to mechanical properties, pyrolytic graphite provides tensile strengths at room temperatures and in the basal plane, which exceed 20,000 p.s.i. With increasing temperature, the pyrolytic graphite attains tensile strengths reaching values as high as 80,000 p.s.i. at 5,000° F. (i.e. 2,750° C.). Thus, for this temperature range, pyrolytic graphite is ten times stronger than ordinary commercial graphites. In addition, where commercial graphites begin to lose strength at temperatures above 4500° F., pyrolytic graphite's strength increases by a factor of two from 4500° F. to 5000° F. Likewise, its ductility also increases at temperatures in excess of 4500° F. The stress-strain curves for pyrolytic graphite indicate a considerably greater strength than other materials at high temperatures and on a strength to weight basis, it is superior by a factor of 5 over any other known material.

It is known that fine filaments of materials have much greater tensile strength than the same materials in bulk form. Whiskers or single crystal filaments of pure materials have tensile strengths of approximately $1 \times 10^6$ p.s.i. Thus, graphite whiskers have measured tensile strength at room temperature of the order of $3 \times 10^6$ p.s.i. However, high temperature forms of pyrolytic carbon filaments produced by the processes herein described have high tensile strengths and above 2500° C. (4500° F.) higher than any other known material. Since this material has a density of .07 lbs./inch³, this yields a strength to weight ratio of $1.5 \times 10^6$ at 5000° F.

Pyrolytic carbon with its high strength at superhigh temperatures, can be used in combination with a ceramic or glass filament for high strength at low temperatures and provides an ideal high strength light weight missile component.

Referring to FIGURE 1, a hydrocarbon gas, such as methane, propane, benzene, butane, acetylene, ethane or toluene and hydrogen from inlets 1 and 2 respectively, are purified and dried in a conventional manner, for example, by a deoxidizer 3 and a dryer 4 in the case of hydrogen. These gases are mixed with a metered amount of refractory metal halide in a vaporizer 5.

A programmed deposition in vacuum chamber 6, evacuated by pump 7, will terminate with a nearly stoichiometric mixture of halide and hydrocarbon, thus resulting in a final coating of pure carbide on a suitable base or deposition surface. The waste gases are removed by being passed through a condenser 8 and trap 9.

Figure 4:
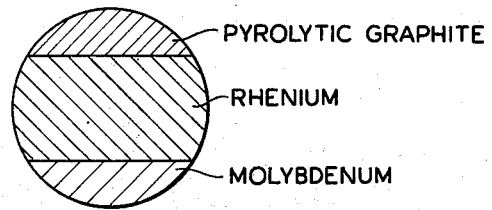
FIGURE 4 shows an ablative filament of refractory materials deposited by the methods illustrated in FIGURES 1 and 2.

Various combinations and layers of metal can be formed in htis manner as shown in FIGURE 4, for example, successive layers of molybdenum, rhenium and pyrolytic graphite. Other combinations may be formed to thereby create a wide variety of ablative filaments with layered refractory materials. The pyrolytic graphite can be produced over a wide density range dependent on the temperature of preparation. Higher densities result from a higher degree of crystallite orientation at higher temperatures.

Referring to the gas cracking apparatus of FIGURE 2, the vacuum furnace 20 is water cooled and its inner walls 21 are coated or insulated with ceramic material. It is heated by a graphite resistance element 22 to a high temperature sufficient to crack the various gas vapors such as refractory metal halide and methane which are allowed to enter it under controlled feed (FIGURE 1). At this high temperature, the various gases become intimately mixed and undergo decomposition. The waste gases are drawn off in the exhaust 23 corresponding to the condenser 8 and trap 9 of FIGURE 1. The refractory metal and ablative filament material deposits on a mandrel 26 from the original decomposed gases, which provide the metallic and/or carbon vapors for deposition on the surface of the mandrel base.

Figure 3E:

The mandrel 26 is constructed with a spiral thread 27 running through its length as shown in FIGURE 3A. However, straight grooves on a mandrel for straight lengths may be utilized as illustrated in FIGURE 3E.

As the decomposed gases and vapors are deposited on the mandrel 26, the spiral threads 27 are built up and filled with ablative refractory material, thus making a smooth uniform coating over the entire mandrel, as illustrated in FIGURE 3B.

After a smooth coating has been laid down, the vacuum furnace 20 is shut down, the mandrel 26 is removed therefrom and machined by a sharp cutting tool or diamond wheel 28 to the top of the mandrel thread 27 as illustrated in FIGURE 3C. Then the filament 29, which is embedded in the mandrel threads is removed freely therefrom to be subsequently utilized for any desired purpose.

Pure crystalline filaments of ablative materials formed by the process described in connection with FIGURES 1 and 2, as well as filaments formed from a combination of pure refractory metals, pyrolytic graphite, refractory metallic carbides or silica, may be manufactured in accordance with the aforementioned processes for depositing ablative materials from metallic vapors and hydrogen gases cracked in high temperature vacuum furnaces. The length, diameter, shape and combination of refractory and ablative materials may be proportioned in accordance with a particular use desired, and encompass coiled lengths of 1000 feet or more. Also, the various filaments per se, or combined with various binders as disclosed herein, may be utilized for spiral winding to form rocket body structures as well as various intricate shapes capable of withstanding very high temperatures and pressures.

The data for an actual run, in this case to produce pure pyrolytic graphite filaments, is illustrated by the following charts.

Chart I shows filament density as a function of deposition temperature wherein, the chamber pressure was 4 mm. Hg and the gas flow which was adjusted to maintain this pressure was 6 l.p.m. (liters per minute). The hydrocarbon source gas used was chemically pure methane.

*Chart I*

| Density (gm./cc.): | Temperature, ° C. |
|---|---|
| 1.95 | 1900 |
| 2.15 | 2000 |
| 2.24 | 2100 |
| 2.24 | 2200 |
| 2.24 | 2300 |

Chart II shows the deposition rate, of the pyrolytic graphite filaments, as a function of deposition temperature; chamber pressure being 4 mm. Hg and the gas flow being 6 l.p.m. The hydrocarbon source gas used was chemically pure methane.

*Chart II*

| Deposition rate (mils/hour): | Temperature, ° C. |
|---|---|
| 10 | 1900 |
| 15 | 2000 |
| 18 | 2100 |
| 21 | 2200 |
| 23 | 2300 |

Although hydrocarbon gas dilution with hydrogen or argon can be used, as previously described, the preferred method is to use only chemically pure hydrocarbon gases.

When it is desired to produce a filament containing refractory metals, metallic vapor is introduced into the process as hereinbefore described. The proportion of metallic vapor to hydrocarbon gas can be varied from 0 to 10 or more; the more parts of metallic vapor employed, the more closely the filament will approach that of a pure refractory metal. The amount of hydrogen gas used can be varied from zero to one part and the pressure can be varied from 2 mm.–10 mm. Hg. The preferred relationship of the gases used can be expressed as follows:

0–10 parts metallic vapor:1 part hydrocarbon:0–1 part hydrogen.

Utilizing the foregoing ablative filament making process, various types of refractory and refractory-alloy filament combinations can be produced. For example, a pyrolytic carbon filament can be made incorporating boron or other refractory materials such as tungsten, tantalum, niobium, molybdenum, zirconium, vanadium, titanium, thorium and chromium. The metals are obtained by vaporizing various decomposable compounds containing said metals; for example, halides, oxides and various organo-metallic materials, such as carbonyls and dicumene compounds. Typical of refractory-alloy filament combinations, would be tantalum-niobium, titanium-tantalum and molybdenum-tungsten.

A pyrolytic carbon filament incorporating boron or other refractory materials offers the characteristic properties of higher strength at low temperatures, as well as at high temperatures. For example, additions of boron in the vapor phase during the deposition process in the fabrication of bulk pyrolytic carbon will increase the room temperature tensile strength of this material from 18,000 p.s.i. to 30,000 p.s.i. In the deposition process, various metal and non-metal combinations may be produced, such as boron carbide, niobium carbide, tantalum carbide, tungsten carbide, and the like. This method also permits the making of superhigh temperature alloyed filaments of metals that melt in the range of 5000° F., commercially in extremely long lengths.

Basic filaments in continuous long lengths in accordance with the invention, can be protectively coated with ceramics, silicides or refractory metals by means of a flame spray technique. Such filaments can be subjected to the flame spray because of their superhigh temperature resistance properties. Thereby, uniform coatings of such protective materials in extremely long lengths are made feasible.

At higher temperatures, pure pyrolytic graphite becomes stronger and ductile. As the temperature rises, its strength increases, whereas metallic filaments will melt at extremely high temperature, pyrolytic graphite will improve in physical and structural properties.

The alloying and the making of carbides will tend to improve its properties at lower, and even at room temperatures.

At temperatures of 5000–7000° F., most metals will melt and gasify. Therefore, in metal carbides as above, these metallic alloys will tend to offer a cooling effect to the basic pyrolytic graphite as the metals evaporate. Therefore, the pyrolytic carbon will ablate at lower rates with attendant advantages for the missile and rocket fields.

Materials fabricated from the ablative refractory filaments 29 into cloth, forms and the like, which can withstand very high and extreme temperatures, are highly important in the space and missile fields. Due to their high sublimation points, high strength and anisotropic heat transfer properties, at elevated temperatures, pyrolytic graphite filaments and like ablative, refractory filamentary materials are significant for application to rocket nozzles, nozzle liners, re-entry bodies. High heat transfer over the surface of a nose cone and low transfer through its walls, make unusually high rates of ablative and radiative cooling feasible.

Further processing can be used to straighten the aforementioned spiral filaments 29. The filaments 29 can be straightened out into straight lengths and stretched to finer and stronger diameters by hot working them at high temperatures. This stretching or straightening process is also an integral part of the ablative filament fabrication method heretofore disclosed.

Figure 5:
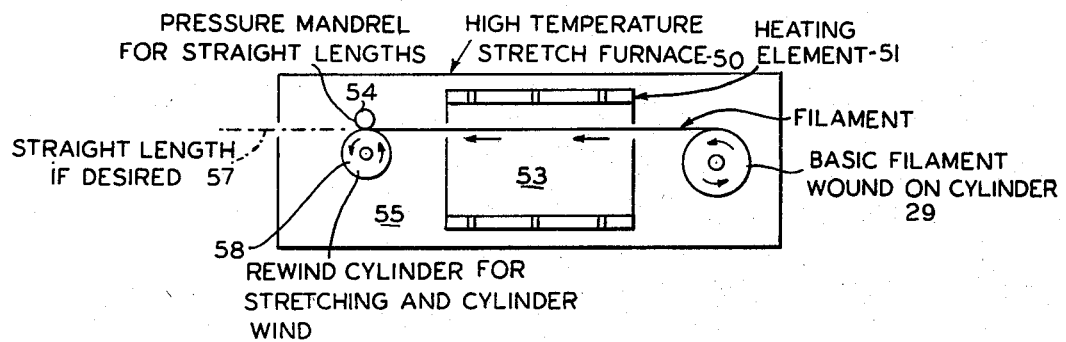
FIGURE 5 shows hot zone straightening and stretching furnaces for the filaments illustrated in FIGURES 3C–3E.

Referring to FIGURE 5, a high temperature, filament stretching furnace 50 is provided with a heater element 51 for straightening the coiled filaments 29 wound on a spool 52. The ablative filament moves through the heating zone 53 of the furnace, where temperatures of 4500–6400° F. exist, to straighten and stretch the processed filamentary material 29. Pressure mandrels 54 and take-up rewind spools 55 provide either for a straight length of wire filament 57 or for a stretched cylindrical winding 58.

Although at low temperatures, pyrolytic graphite is a brittle material, at high temperatures it becomes ductile. Under stress and accompanying elongation, further crystal orientation and ordering takes place, with increase in strength. The ductility of pyrolytic graphite at temperatures above 4500° F. permits elongation to 120% and greater at stresses of approximately 80,000 p.s.i. Hot stressing of filamentary forms of pyrolytic graphite result in increased strength for filament diameters down to the low micron range.

It should be apparent to those skilled in the art that various modifications may be made in the processing methods described, or in the resultant products thereof without departing from the spirit and scope of the invention.

What is claimed is:

1. The method of forming a pure and non-melting filament, comprising the steps of cracking a hydrocarbon gas at a temperature of at least 3,450 to 5,000 degrees Fahrenheit to form a vapor, depositing said vapor on a mandrel, which has a grooved surface, to form a coating thereon, removing said coating from said grooved surface mandrel in the form of a filament, and stretching said filament at a temperature of upwards of about 4500 degrees Fahrenheit to increase its tensile strength.

2. The method of forming a pure and non-melting filamentary metal carbide, comprising the steps of cracking a mixture of hydrocarbon and refractory metal gases at a temperature of at least 3,450 to 5,000 degrees Fahrenheit to form a vapor, depositing said vapor on a mandrel, which has a grooved surface, to form a coating thereon, removing said coating from said grooved surface mandrel in the form of a filament, and stretching said filament at a temperature of upwards of about 4500 degrees Fahrenheit to increase its tensile strength.

3. The method of forming a pure and non-melting filamentary metal carbide, comprising the steps of cracking a mixture of hydrocarbon gas and decomposable refractory metal compounds at a temperature of at least 3,450 to 5,000 degrees Fahrenheit to form a vapor, depositing said vapor on a mandrel which has a grooved surface, to form a coating thereon, removing said coating from said grooved surface mandrel in the form of a filament, and stretching said filament at a temperature of upwards of about 4500 degrees Fahrenheit to increase its tensile strength.

References Cited

UNITED STATES PATENTS

| 1,345,441 | 7/1920 | Hisamoto. |
| 2,304,206 | 12/1942 | Reichel _____ 264—215 X |
| 2,957,756 | 10/1960 | Bacon _____ 23—209.2 |
| 3,138,434 | 6/1964 | Diefendorf _____ 23—209.3 |

ROBERT F. WHITE, *Primary Examiner.*

J. A. FINLAYSON, J. R. HALL, *Assistant Examiners.*